(12) United States Patent
Lin et al.

(10) Patent No.: US 7,146,308 B2
(45) Date of Patent: Dec. 5, 2006

(54) DISCOVERY OF INFERENCE RULES FROM TEXT

(76) Inventors: Dekang Lin, 245 Falconer End, Edmonton, Alberta (CA) T6R 2V6; Patrick Pantel, 248 Huntington Hill, Edmonton, Alberta (CA) T6H 5Y6

( * ) Notice: Subject to any disclaimer, the term of this patent is extended or adjusted under 35 U.S.C. 154(b) by 943 days.

(21) Appl. No.: 09/826,355

(22) Filed: Apr. 5, 2001

(65) Prior Publication Data

US 2003/0004915 A1    Jan. 2, 2003

(51) Int. Cl.
*G06F 17/27* (2006.01)
*G06F 17/21* (2006.01)
*G06F 17/28* (2006.01)

(52) U.S. Cl. .................. 704/9; 704/4; 704/10

(58) Field of Classification Search .............. 704/10, 704/8, 2, 7, 4, 9; 455/406, 407, 408, 415, 455/550.1, 565, 566; 379/114.01, 114.03, 379/114.09, 114.21, 114.22, 114.23, 114.26, 379/140

See application file for complete search history.

(56) References Cited

U.S. PATENT DOCUMENTS

| | | | | |
|---|---|---|---|---|
| 5,289,376 A | * | 2/1994 | Yokogawa ................... | 704/10 |
| 5,424,947 A | * | 6/1995 | Nagao et al. ................. | 704/10 |
| 5,926,784 A | * | 7/1999 | Richardson et al. .......... | 704/10 |
| 5,937,385 A | * | 8/1999 | Zadrozny et al. ........... | 704/257 |
| 5,991,712 A | * | 11/1999 | Martin ......................... | 704/10 |
| 5,995,918 A | * | 11/1999 | Kendall et al. ................ | 704/1 |
| 6,161,084 A | * | 12/2000 | Messerly et al. ............. | 704/10 |

OTHER PUBLICATIONS

Fraser et al. Inheritence in Word Grammar, 1992, Association for Computer Linguistics, pp. 133-158.*

Delugach et al. Wizard: A Database Inference Analysis and Detection System, Feb. 1996, IEEE Transactions On Data and Knowledge Engineering, vol. 8, No. 1, pp. 56-66.*

Richardson et al. MindNet: Acquiring and structuring semantic information from text, May 1998, Association for Computational Linguistics, pp. 1098-1102.*

"Fast and Effective Text Mining Using Linear-time Documents Clustering", Bjornar Larson and Chinatsu Aone, KDD-99 San Diego, California, United States, Copyright ACM 1999 1-58113-143-7/99/08, pp. 16-22.

"Text Mining: Natural Language techniques and Text Mining applications", M. Rajman and R. Besançon, Chapman & Hall, IFIP 1997, pp. 2-15.

"Extracting Classification Knowledge of Internet Documents with Mining Term Associations: A Semantic Approach", Shian-Hua Lin, Chi-Sheng Shih, Meng Chang Chen, Jan-Ming Ho, Ming-Tat Ko and Yueh-Ming Huang, SIGIR'98, Melbourne, Australia, Copyright 1998 ACM 1-58113-015-5 Aug. 1998, pp. 241-249.

(Continued)

*Primary Examiner*—Richemond Dorvil
*Assistant Examiner*—Thomas E. Shortledge

(57) ABSTRACT

The present invention provides a facility for discovering a set of inference rules, such as "X is author of Y≈X wrote Y", "X solved Y≈X found a solution to Y", and "X caused Y≈Y is triggered by X", by analyzing a corpus of natural language text. The corpus is parsed to identify grammatical relationships between words and to build dependency trees formed of the relationships between the words. Paths linking words in the dependency trees are identified. If two paths tend to link the same sets of words, their meanings are taken to be similar. An inference rule is generated for each pair of similar paths. The output of the inventive system is a set of inference rules and a database in which to store these inference rules. The rules generated by the system are interpretable by machines and used in other applications (e.g. information extraction, information retrieval, and machine translation).

19 Claims, 6 Drawing Sheets

OTHER PUBLICATIONS

"Automatic Acquisition of Hyponyms from Large Text Corpora", Marti A. Hearst, Proceedings of the Fourteenth International Conference on Computational Linguistics, Nantes, France, Jul. 1992, 8 pages.

"Automatic Search Term Variant Generation", K. Sparck Jones and J.I. Tait, *Journal of Documentation,* vol. 40, No. 1, Mar. 1984, pp. 50-66.

"Boosting Variant Recognition with Light Semantics", Cécile Fabre and Christian Jacquemin, Cooling-2000, Saarbrucken, Germany, Aug. 2000, pp. 264-270.

"Principle-Based Parsing Without Overgeneration", Dekang Lin, in proceedings of ACL-93, Columbus, Ohio, Jun. 1993, pp. 112-120.

"English for the Computer: The SUSANNE Corpus and Analytic Scheme", Geoffrey Sampson, Clarendon Press, Oxford, 1995, pp. 1-11.

"A New Statistical Parser Based on Bigram Lexical Dependencies", Michael John Collins, cmp-lg/9605012 May 6, 1996, 4 pages (double sided).

"A Maximum-Entropy-Inspired Parser", Eugene Charniak, in proceedings of the First North American Chapter of ACL, Seattle, Washington, Apr. 2000, pp. 132-139.

"Distributional Structure", Z. Harris, from *Word* 10 No. 2-3 (1954) pp. 775-793 and notes, pp. 26-47.

"Extracting Collocations from Text Corpora", Dekang Lin, in proceedings of the Workshop on Computational Terminology, Montreal, Canada, Aug. 1998, pp. 57-63.

"Thesaurus Construction", Padmini Srinivasan, *Information retrieval Data Structures and Algorithms,* Chapter 9, eds. Frakes, W.B. and Baeza-Yates R., Prentice Hall, 1992, pp. 161-176.

"Efficient Clustering of High-Dimensional Data Sets with Application to Reference Matching", Andrew McCallum, Kamal Nigam and Lyle H. Unger, KDD 2000, Boston, MA, United States, Copyright ACM, Aug. 2000 1-58113-233-6/00/08, pp. 169-178.

* cited by examiner

DISCOVERY OF INFERENCE RULES FROM TEXT

FIELD OF THE INVENTION

This invention relates to the field of artificial intelligence, and, more specifically, to the fields of computational linguistics and information retrieval.

BACKGROUND OF THE INVENTION

Text is the most significant repository of human knowledge. Many algorithms have been proposed to mine textual data. Algorithms have been proposed that focus on document clustering (Larsen, B. and Aone, C. 1999. Fast and effective text mining using linear-time document clustering. In *Proceedings of KDD*-99. pp. 16–22. San Diego, Calif.), identifying prototypical documents (Rajman, M. and Besançon, R. 1997. Text Mining: Natural Language Techniques and Text Mining Applications. In *Proceedings of the seventh IFIP 2.6 Working Conference on Database Semantics (DS*-7).), or finding term associations (Lin, S. H., Shih, C. S., Chen, M. C., et al. 1998. Extracting Classification Knowledge of Internet Documents with Mining Term Associations: A Semantic Approach. In *Proceedings of SIGIR*-98. Melbourne, Australia.) and hyponym relationships (Hearst, M. 1992. Automatic Acquisition of Hyponyms from Large Text Corpora. In *Proceedings of ACL*-92. Nantes, France.) This invention addresses an unsupervised method for discovering inference rules, such as "X is author of Y≈X wrote Y", "X solved Y≈X found a solution to Y", and "X caused Y≈Y is triggered by X". Inference rules are extremely important in many fields such as natural language processing, information retrieval, and artificial intelligence in general.

For example, consider the query to an information retrieval system: "Who is the author of the 'Star Spangled Banner'?" Unless the system recognizes the relationship between "X wrote Y" and "X is the author of Y", it would not necessarily rank the sentence . . . Francis Scott Key wrote the "Star Spangled Banner" in 1814.

higher than the sentence

. . . comedian-actress Roseanne Barr sang her famous shrieking rendition of the "Star Spangled Banner" before a San Diego Padres-Cincinnati Reds game.

The statement "X wrote Y≈X is the author of Y" is referred to in this patent document as an inference rule. In previous work, such relationships have been referred to as paraphrases or variants (Sparck Jones, K. and Tait, J. I. 1984. Automatic Search Term Variant Generation. *Journal of Documentation*, 40(1):50–66.; Fabre, C. and Jacquemin, C. 2000. Boosting Variant Recognition with Light Semantics. In *Proceedings of COLING*-2000. Sarrebrücken, Germany.) In this patent document, inference rules include relationships that are not exactly paraphrases, but are nonetheless related and are potentially useful to information retrieval systems. For example, "X caused Y≈Y is blamed on X" is an inference rule even though the two phrases do not mean exactly the same thing.

Traditionally, knowledge bases containing such inference rules are created manually. This knowledge engineering task is extremely laborious. More importantly, building such a knowledge base is inherently difficult since humans are not good at generating a complete list of rules. For example, while it is quite trivial to come up with the rule "X wrote Y≈X is the author of Y", it seems hard to dream up a rule like "X manufacture Y≈X's Y factory", which can be used to infer that "Chrétien visited Peugot's newly renovated car factory in the afternoon" contains an answer to the query "What does Peugot manufacture?"

It is known in the art of information retrieval to identify phrasal terms from queries and generate variants for query expansion. Query expansion is known to promote effective retrieval of information and a variety of query expansion algorithms have been proposed. U.S. Pat. No. 6,098,033 issued Aug. 1, 2000, disclosed a method for computing word similarity according to chains of semantic relationships between words. Examples of such semantic relationships include Cause, Domain, Hypernym, Location, Manner, Material, Means, Modifier, Part, and Possessor. While the method disclosed in (U.S. Pat. No. 6,089,033) uses chains of relationships as features to compute similarities between words, the invention disclosed in this patent document uses words as features to compute the similarity between chains of relationships.

U.S. Pat. No. 6,076,088 issued Jun. 13, 2000, disclosed a method to extract Concept-Relation-Concept (CRC) triples from a text collection and to use the extracted CRC triples to answer queries about the text collection. The invention disclosed in this patent document differs from U.S. Pat. No. 6,076,088. Particularly, the CRC triples represent information explicitly stated in the text collection whereas operation of the present invention results in inference rules that are typically not stated explicitly in a text collection.

SUMMARY OF THE INVENTION

This invention provides a facility for discovering a set of inference rules, such as "X is author of Y≈X wrote Y", "X solved Y≈X found a solution to Y", and "X caused Y≈Y is triggered by X", by analyzing a corpus of natural language text. The corpus is parsed to identify grammatical relationships between words and to build dependency trees formed of the relationships between the words. Paths linking words in the dependency trees are identified. If two paths tend to link the same sets of words, their meanings are taken to be similar. An inference rule is generated for each pair of similar paths. The output of the inventive system is a set of inference rules. The rules generated by the system are interpretable by machines and used in other applications (e.g. information extraction, information retrieval, and machine translation). By contrast with Richardson (U.S. Pat. No. 6,098,033), paths are used as features to compute the similarity of words.

Thus, according to an aspect of the invention, there is provided a method of building a database from text, the method comprising the steps of parsing text to identify paths formed by concatenated relationships between words in the text and associating, in a computer, paths with each other based on a similarity measure between the paths. The similarity measure is based on the frequency of occurrences of words in the paths, where the words are at the end points of the paths. The step of associating paths with each other preferably comprises the step of counting occurrences of words at the end points of specific paths. Paths are associated based on the counts of occurrences of the words at the end points of the paths. Paths are associated only when the similarity measure exceeds a threshold.

In another aspect of the invention, there is provided a method of information retrieval, the method comprising the steps of initiating a search for electronic information and expanding the search by reference to associated paths in a database constructed according to the preceding method of building a database. The search may be initiated from a location remote from the location of the database.

In another aspect of the invention, there is provided computer readable media containing instructions for carrying out the method steps.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, "comprising" means "including". In addition, a reference to an element by the indefinite article "a" does not exclude the possibility that more than one of the element is present. Parsing, when referred to in this patent document, means a computer implemented system for analyzing syntactic structures of electronic text. Furthermore, "text" and "corpus" means "any collection of natural language text".

Figure 1:
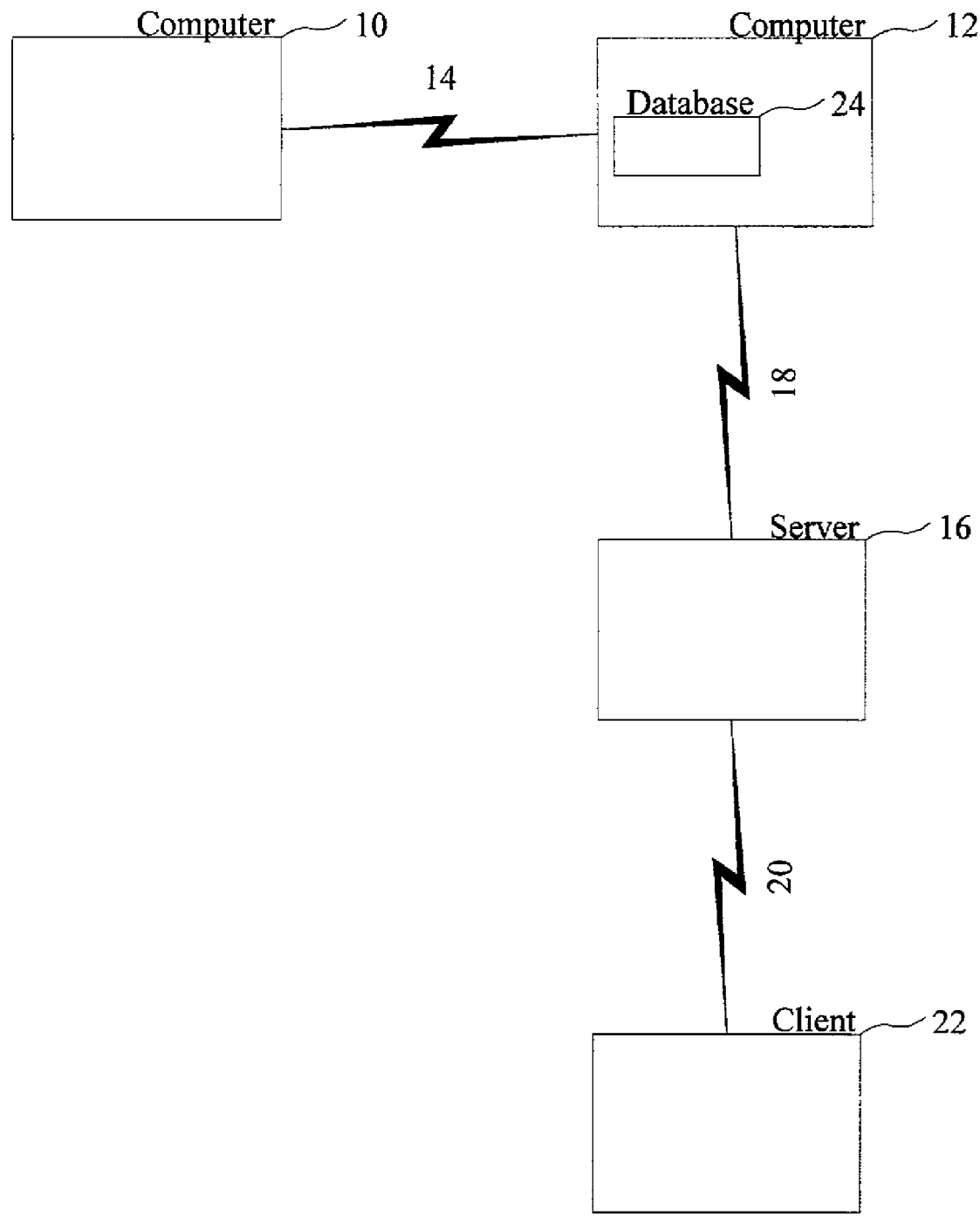
FIG. 1 shows an information retrieval system using an inference rule database created according to the invention.

Referring to FIG. 1, a method of building a database containing rules relating expressions in natural language text may be implemented in a general purpose computer 10, which may be any one of many PCs or other computers available on the market. The database 24 created by the method may be stored in another (or the same) general purpose computer 12, which need not be in the same location as computer 10. The computers 10 and 12 are linked by a communication link 14, which could be any suitable link and does not have to be permanent, including a network such as the Internet. The computer 12 may be accessed for the purpose of information retrieval by a server 16, which in turn may be linked to the computer 12 by any suitable link 18, such as the Internet. The server 16 is connected by any suitable link 20, such as the Internet, to a client 22. A person searching for information inputs a search string to client computer 22. The search string is forwarded to the server 16, which parses the string and extracts paths from the parsed string. The paths are then forwarded to the computer 12 to retrieve associated paths from the database 24. The associated paths are then used in server 16 to expand the set of words in the search string. The expanded search string is used to carry out the search according to conventional search techniques. Apart from the manner of construction of the database, and the content of the database, the techniques for carrying out the search illustrated in FIG. 1 are known. For real time access, the server 16 may directly instruct the computer 10 to parse text and retrieve associated relations and then perform the search using the original search string as well as associated relations.

The database is created by a method of discovering inference rules from text. Any text may be used to create the database. For example, medical text may be used to generate inference rules in a medical domain. The first step is to parse the text. Any of a variety of parsers may be used. The parser output identifies characteristics or attributes of the words (noun, verb, etc), grammatical relationships between the words and paths formed by the grammatical relationships.

As used in this patent document, a dependency relationship is a grammatical relationship, which is an asymmetric binary relationship between a word called head, and another word called modifier. The structure of a sentence is represented by a set of dependency relationships that form a tree. A word in the sentence may have several modifiers, but each word may modify at most one word. The root of the dependency tree does not modify any word. It is also called the head of the sentence.

Figure 2A:
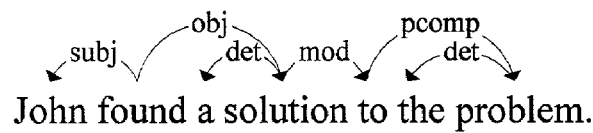
FIGS. 2A and 2B are each diagrams showing a dependency tree for use in a system of the invention.
Figure 2B:
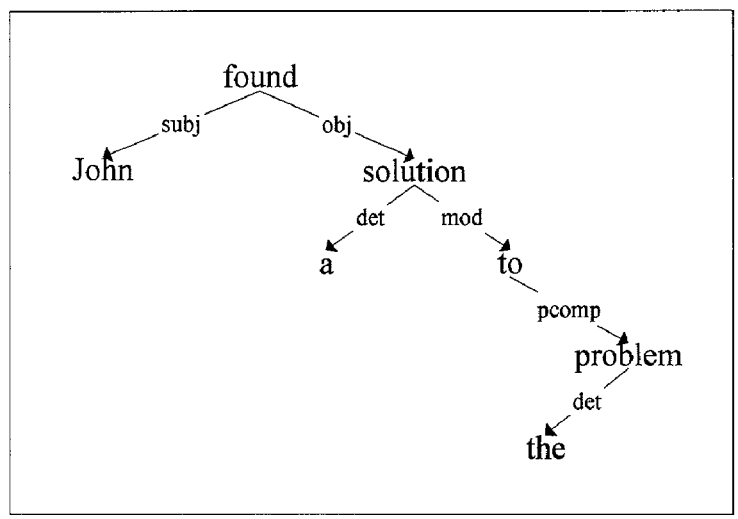

For example, FIGS. 2A and 2B show the dependency tree for the sentence "John found a solution to the problem", generated by a broad-coverage English parser called Minipar (Lin, D. 1993. Principle-Based Parsing Without OverGeneration. In *Proceedings of ACL*-93. pp. 112–120. Columbus, Ohio), which is available by contacting the Department of Computer Science at the University of Alberta, Canada. FIG. 2A is a more compact form for the dependency tree of FIG. 2B. The links in the diagram represent dependency relationships. The direction of a link is from the head to the modifier in the relationship. Labels associated with the links represent types of dependency relations. Table 1 lists a subset of the dependency relations in Minipar outputs.

The exemplary parser, Minipar, parses newspaper text at about 500 words per second on a Pentium-III(tm) 700 Mhz with 500 MB memory. Evaluation with the manually parsed SUSANNE corpus (Sampson, G. 1995. *English for the Computer—The SUSANNE Corpus and Analytic Scheme*. Clarendon Press. Oxford, England.) shows that about 89% of the dependency relationships in Minipar outputs are correct. Other broad-coverage English parsers such as those of Collins, 1996 (Collins, M. J. 1996. A New Statistical Parser Based on Bigram Lexical Dependencies. In *Proceedings of ACL*-96. pp. 184–191. Santa Cruz, Calif.); Charniak, 2000 (Charniak, E. 2000. A Maximum-Entropy-Inspired Parser. In *Proceedings of the North American Chapter of the Association for Computational Linguistics*. pp. 132–139. Seattle, Wash.) may also be used to parse text.

Figure 3:
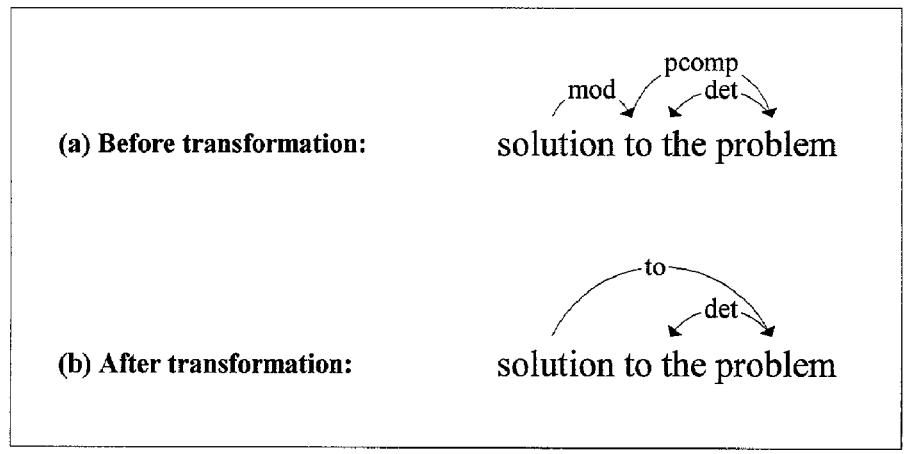
FIG. 3 is a diagram illustrating a transformation used for modifying a dependency tree.

In the dependency trees generated by Minipar, prepositions are represented by nodes. A transformation is applied for all the dependency trees. For each preposition, the prepositional complement is connected directly to the words modified by the preposition. The proposition is assigned as the label of the direct relationship. FIG. 3 gives an example for the phrase "solution to the problem" in which the two links in part (a) are replaced with a direct link shown in part (b).

After the transformation, each link between two words in a dependency tree represents a direct semantic relationship. A path is used to represent indirect semantic relationships between two content words (i.e. nouns, verbs, adjectives or adverbs). A path is named by concatenating dependency relationships and words along the path, excluding the words at the two ends. For the sentence in FIGS. 2A and 2B, the path between John and problem is named: N:subj: V←find→V:obj:N→solution→N:to:N (meaning "X finds solution to Y"). The reverse path can be written as:N:to: N←solution←N:obj:V←find→V:subj:N. The root of both paths is find. A path begins and ends with two dependency relations, which are defined as the two slots of the path: SlotX on the left-hand side and SlotY on the right-hand side. The words connected by the path are called the fillers of the slots. For example, John fills the SlotX of N:subj: V←find→V:obj:N→solution→N:to:N and problem fills the SlotY. The reverse is true for N:to:N←solution←N:obj: V←find→V:subj:N. In a path, dependency relations that are not slots are called internal relations. For example, find→V: obj:N→solution is an internal relation in the path N:subj: V←find→V:obj:N→solution→N:to:N.

Preferably, a set of constraints is imposed on the paths to be extracted from text for the following reasons:
  most meaningful inference rules involve only paths that satisfy these conditions;
  the constraints significantly reduce the number of distinct paths and, consequently, the amount of computation required for computing similar paths (described below); and
  the constraints alleviate the sparse data problem because long paths tend to have very few occurrences.

Figure 4:
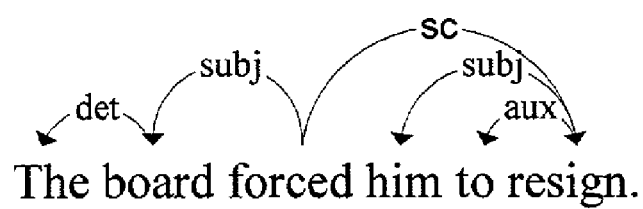
FIGS. 4 and 5 illustrate dependency trees for specific sentences.

The constraints are:
  slot fillers must be nouns because slots correspond to variables in inference rules and the variables are instantiated by entities;
  any dependency relation that does not connect two content words is excluded from a path. E.g. in FIGS. 2A and 2B, the relation between a and solution is excluded;
  the frequency count of an internal relation must exceed a threshold; and
  an internal relation must be between a verb and an object-noun or a small clause. The relationship between find and solution in "John found a solution to the problem" is an example of a verb-object relation. The relationship between force and resign is an example of a verb-small clause relationship in the sentence shown in FIG. 4.

Figure 5:
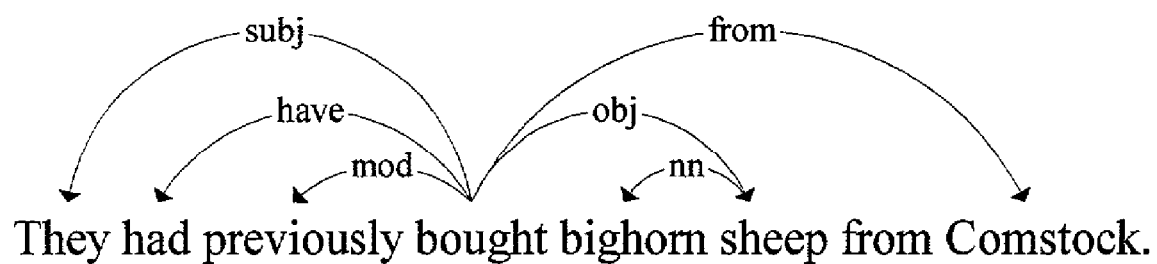

The paths extracted from the exemplary sentence shown in FIG. 5 and their meanings are:

| | |
|---|---|
| N: subj: V←buy→V: from: N | (X buys something from Y) |
| N: subj: V←buy→N: obj: N | (X buys Y) |
| N: subj: V←buy→V: obj: N→sheep→N: nn: N | (X buys Y sheep) |
| N: nn: N←sheep←N: obj: V←buy→V: from: N | (X sheep is bought from Y) |
| N: obj: V←buy→V: from: N | (X is bought from Y) |
| N: from: V←buy→V: subj: N | (Y buys something from X) |
| N: obj: V←buy→V: subj: N | (Y buys X) |
| N: nn: N←sheep←N: obj: V←buy→V: subj: N | (Y buys X sheep) |
| N: from: V←buy→V: obj: N→sheep→N: nn: N | (Y sheep is bought from X) |
| N: from: V←buy→V: obj: N | (Y is bought from X) |

A path is a binary relation between two entities. This invention incorporates an algorithm to automatically discover the inference relations between such binary relations.

In the preferred embodiment, the algorithm makes use of an extension of the principle, known as the Distributional Hypothesis (Harris, Z. 1985. Distributional Structure. In: Katz, J. J. (ed.) The Philosophy of Linguistics. New York: Oxford University Press, pp. 26–47.) According to the Distributional Hypothesis words that tend to occur in the same contexts tend to have similar meanings. The present invention makes use of the principle in a different context and in a different way, using different formulae, from previous methods for computing the similarity between two sets of words. Some algorithms use the words that occurred in a fixed window of a given word as its context while others use the dependency relationships of a given word as its context (Lin, D. 1998. Extracting Collocations from Text Corpora. *Workshop on Computational Terminology.* pp. 57–63. Montreal, Canada.) Consider the words duty and responsibility. There are many contexts in which both of these words can fit. For example,
  duty can be modified by adjectives such as additional, administrative, assigned, assumed, collective, congressional, constitutional, . . . , so can responsibility;
  duty can be the object of verbs such as accept, articulate, assert, assign, assume, attend to, avoid, become, breach, . . . , so can responsibility.

Based on these common contexts, one can statistically determine that duty and responsibility have similar meanings.

In the algorithms for finding word similarity, dependency links are treated as contexts of words. In contrast, the algorithm for finding inference rules described here treats the words that fill the slots of a path as a context for the path. Thus, if two paths tend to occur in similar contexts, the meanings of the paths tend to be similar.

For example, Table 2 lists a set of example pairs of words connected by the paths N:subj:V←find→V:obj: N→solution→N:to:N ("X finds a solution to Y") and N:subj:V←solve→V:obj:N ("X solves Y"). As it can be seen from Table 2, there are many overlaps between the corresponding slot fillers of the two paths, which indicates that the two paths have similar meaning.

Given a path p and the words $w_1$ and $w_2$, which fill the SlotX and SlotY of p respectively, (p, SlotX, $w_1$) and (p, SlotY, $w_2$) are called triples and (SlotX, $w_1$) and (SlotY, $w_2$) are features of path p. To compute path similarities, the frequency counts of triples in a corpus are collected.

A database is used to store the frequency counts of the triples. We call this database a triple database. The triple database is organized as a collection of entries, where each entry consists of all triples with a common path. An example entry in the triple database for the path N:subj:V←pull→V:obj:N→body→N:from:N ("X pulls body from Y")

is shown in Table 2A. The first column of numbers in Table 2A represents the frequency counts of a word filling a slot of the path and the second column of numbers is the mutual information between a slot and a slot filler. Mutual information measures the strength of association between a slot and a filler. The triple database records the fillers of SlotX and SlotY separately. Looking at the triple database, one would be unable to tell which SlotX filler occurred with which SlotY filler in the corpus.

Once the triple database is created, the similarity between two paths can be computed. Essentially, two paths have high similarity if there are a large number of common features. However, not every feature is equally important. For example, the word he is much more frequent than the word sheriff. Two paths sharing the feature (SlotX, he) is less indicative of their similarity than if they shared the feature (SlotX, sheriff). The similarity measure used here, which is known in the art in itself (Lin, D. 1998. Extracting Collocations from Text Corpora. *Workshop on Computational Terminology.* pp. 57–63. Montreal, Canada.) takes this into account by computing the mutual information between a feature and a path.

Let |p, SlotX, w| denote the frequency count of the triple (p, SlotX, w), |p, SlotX, *| to denote $$\sum_w |p, SlotX, w|, \text{ and } |*, *, *| \text{ to denote } \sum_{p,s,w} |p, s, w|,$$

Following (Lin, D. 1998. Extracting Collocations from Text Corpora. *Workshop on Computational Terminology.* pp. 57–63. Montreal, Canada.), the mutual information between a path slot and its filler can be computed by the formula:

$$mi(p, Slot, w) = \log\left(\frac{|p, Slot, w| \times |*, Slot, *|}{|p, Slot, *| \times |*, Slot, w|}\right) \quad (1)$$

Equation (1) measures the strength of association between a slot of a path and a filler of that slot. The strength of the association between a slot of a path and a filler of that slot is measured by comparing the observed frequency of the filler-slot combination with the predicted frequency of the filler-slot combination assuming independence between the filler and the slot. The observed frequency of a filler slot combination is |p, Slot, w|. The probability $P_1$ of a word w filling a slot S of any path is:

$$P_1 = \frac{|*, S, w|}{|*, S, *|}$$

The probability $P_2$ of any word filling a slot S of a path p is:

$$P_2 = \frac{|p, S, *|}{|*, S, *|}$$

If we assume that a filler w and a slot S of a path p are independent, the predicted frequency of the slot-filler combination is $P_1 \times P_2 \times |*, S, *|$. Then using the logarithm scale of the two frequency counts $$\log\left(\frac{|p, S, w|}{P_1 \times P_2 \times |*, S, *|}\right) = \log\left(\frac{|p, S, w| \times |*, S, *|}{|p, S, *| \times |*, S, w|}\right)$$

equation 1 is obtained.

A slot s of a path p is denoted by (p, s). The similarity between a pair of slots: $slot_1 = (p_1, s)$ and $slot_2 = (p_2, s)$, is defined as:

$$sim(slot_1, slot_2) = \frac{\sum_{w \in T(p_1,s) \cap T(p_2,s)} mi(p_1, s, w) + mi(p_2, s, w)}{\sum_{w \in T(p_1,s)} mi(p_1, s, w) + \sum_{w \in T(p_2,s)} mi(p_2, s, w)} \quad (2)$$

where $p_1$ and $p_2$ are paths, s is a slot of $p_1$ and $p_2$, $T(p_1, s)$ and $T(p_2, s)$ are sets of words that fill in the s slot of paths $p_1$ and $p_2$ respectively.

Equation (2) measures the similarity between two slots. The similarity of two slots is a ratio between the commonality of the two slots and the totality of the two slots. The commonality of two slots is measured by the sum of association strength between the common fillers of the slots and the respective slots of the fillers. The totality of two slots is measured by the sum of association strength of the fillers of the first slot and the fillers of the second slot. The set of common fillers of two slots ($p_1$, s) and ($p_2$, s) is given by $T(p_1, s) \cap T(p_2, s)$. The commonality of two slots ($p_1$, s) and ($p_2$, s) is given by:

$$\Sigma_{w \in T(p_1,s) \cap T(p_2,s)} mi(p_1,s,w) + mi(p_2,s,w)$$

The totality of two slots ($p_1$, s) and ($p_2$, s) is given by:

$$\Sigma_{w \in T(p_1,s)} mi(p_1,s,w) + \Sigma_{w \in T(p_2,s)} mi(p_2,s,w)$$

The similarity between two slots ($p_1$, s) and ($p_2$, s) is then given by equation 2.

The similarity between a pair of paths $p_1$ and $p_2$ is defined as the geometric average of the similarities of their SlotX and SlotY slots:

$$S(p_1,p_2) = \sqrt{sim(SlotX_1, SlotX_2) \times sim(SlotY_1, SlotY_2)} \quad (3)$$

where $SlotX_i$ and $SlotY_i$ are path i's SlotX and SlotY slots.

Figure 6:
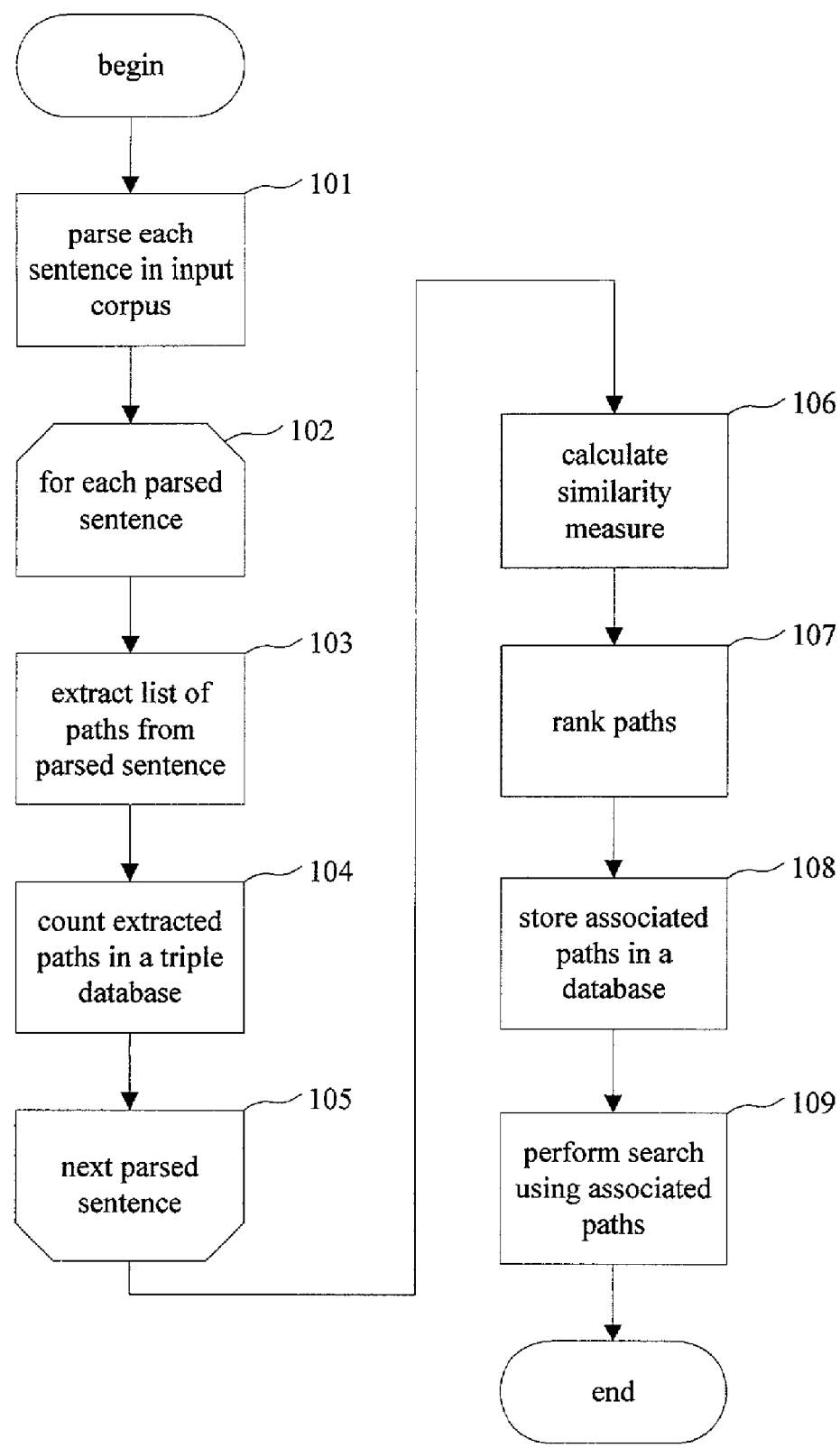
FIG. 6 is a flow diagram illustrating constructing a database of similar paths according to the invention and using the constructed database in an information retrieval system.

Referring to FIG. 6, the steps carried out during an implementation of the invention are set forward. At step 101, each sentence in the text (corpus) under consideration is parsed to identify paths formed by concatenated grammatical relationships between words in the text. For each parsed sentence 102, paths are extracted from the sentence in step 103 and a count is made of the extracted paths in a triple database 104. The counts determined at step 104 are the counts |p, Slot, w|. The program then returns to the next parsed sentence 105 and the process continues until all paths have been counted. The counts are then used as for example in the above noted equations to yield a similarity measure 106, from which a ranked list of associated relations may be produced 107 as described below. Various similarity measures are possible (Frakes, W. B. and Baeza-Yates, R., editors. 1992. *Information Retrieval, Data Structure and Algorithms.* Prentice Hall.) The ranked associated paths 107 are stored in a database 108. The database 108 may then be used in a search 109.

Figure 7:
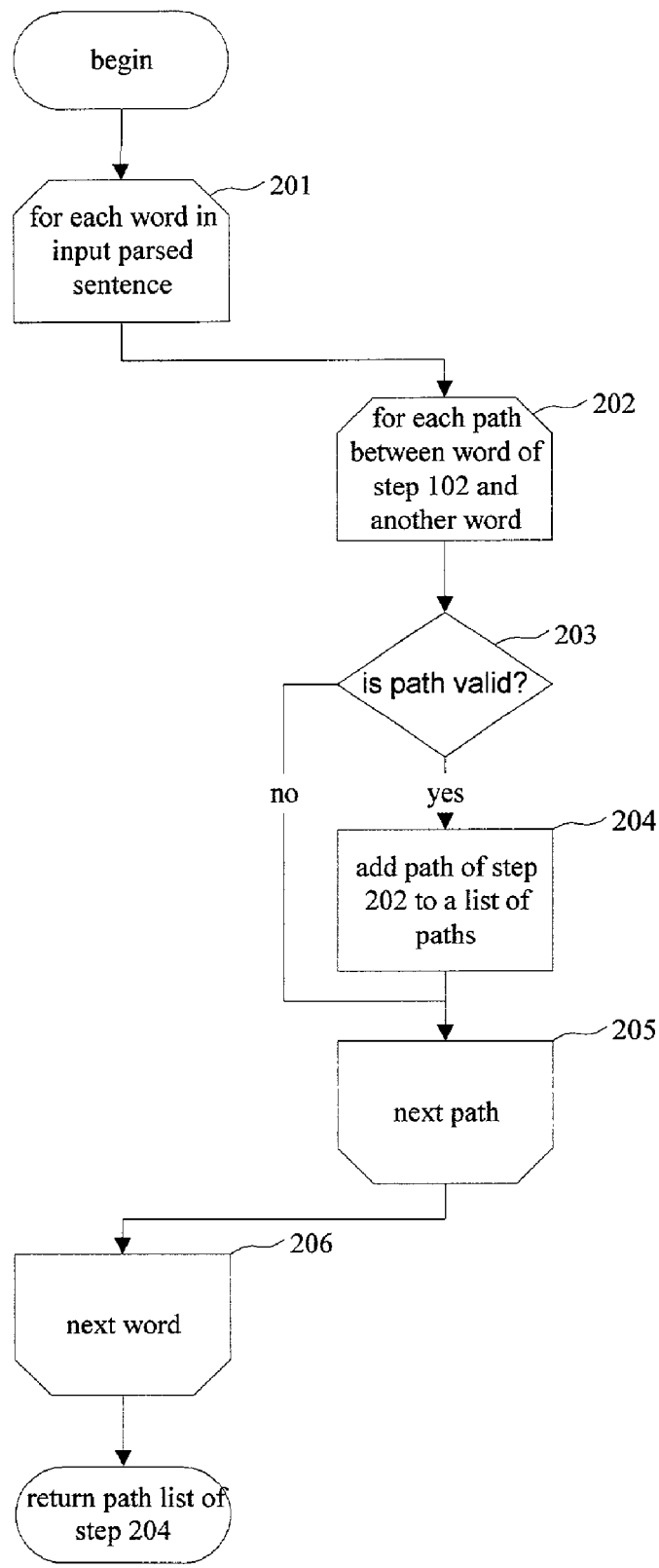
FIG. 7 is a flow diagram illustrating the identification of paths in dependency trees according to the invention.

Step 103 is expanded in FIG. 7. For each word in a parsed sentence 201, and for each path between that word and another word in the same sentence 202, first check that the path is valid 203 and then add it to a list of paths for that word 204, and repeat for each path 205 and for each word 206 to yield a path list for each word and path.

Figure 8:
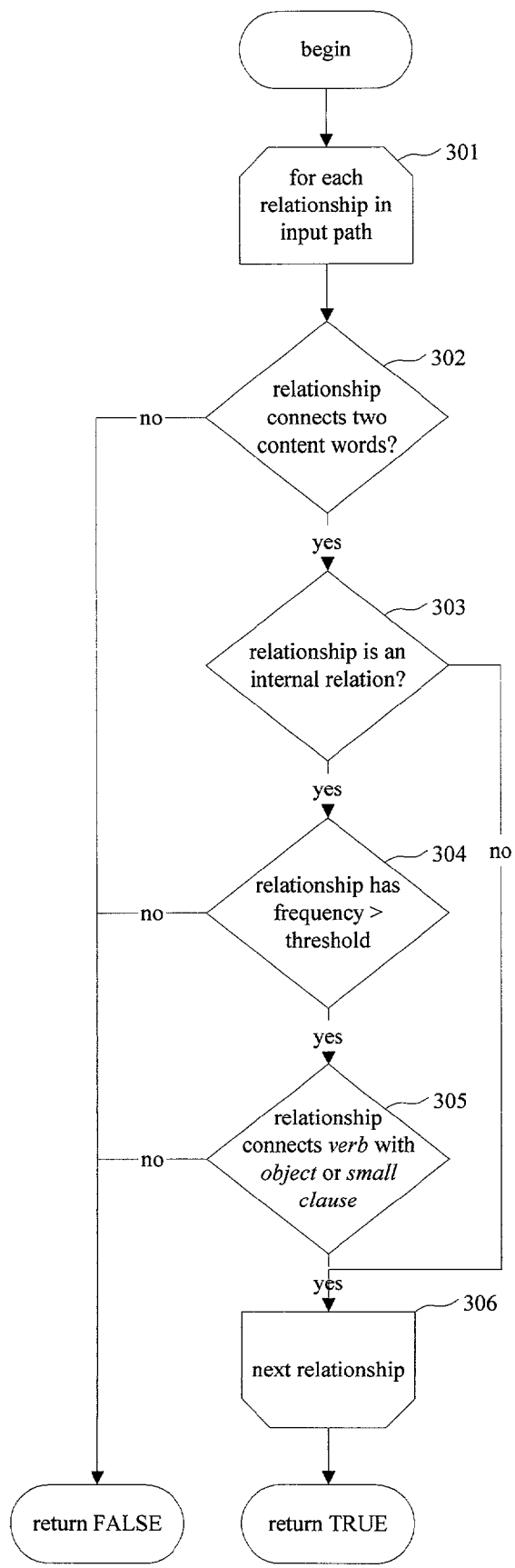
FIG. 8 is a flow diagram illustrating how paths are tested for compliance with constraints designed to identify valid paths.

To check that a path is valid 203, the procedure set forward in FIG. 8 is followed. For each relationship in the input path 301, check that the path satisfies the constraints mentioned above. First check that the relationship connects two content words 302. If the program returns yes for this test, then the program checks if the relationship is an internal relation 303. If the program returns yes for this test, then the program checks whether the relationship has a frequency greater than a threshold 304 and whether the relationship connects a verb with either an object clause or small clause 305. If the program returns no for any of the steps 302, 304, or 305, then the program returns the indicator FALSE for that path in step 203 of FIG. 7. If the program does not return no for any of the steps 302, 304, and 305, then the program repeats this verification 306 for each relationship of the input path. If the program does not return no for steps 302, 304, and 305 for any relationship in the input path, then the program returns the indicator TRUE for that path in step 203 of FIG. 7.

Software for implementing this invention may be readily prepared from the flow diagrams and descriptions set out here. It is preferable to use an existing parsing program for parsing. The software may be stored on computer readable media such as a hard disk or compact disk.

The discovery of inference rules is made by finding the most similar paths of a given path. The challenge here is that there are a large number of paths in the triple database (step 104 of FIG. 6). Even a simple triple database may contain over 200,000 distinct paths. Computing the similarity between every pair of paths is impractical with present computation devices.

Given a path p, an exemplary algorithm for finding the most similar paths of p takes three steps:

1) Retrieve all the paths that share at least one feature with p and call them candidate paths. This can be done efficiently by storing for each word the set of slots it fills in.

2) For each candidate path c, count the number of features shared by c and p. Filter out c if the number of its common features with p is less than a fixed percent (for example 1%) of the total number of features for p and c. This step effectively uses a simpler similarity formula to filter out some of the paths since computing mutual information is more costly than counting the number of features. This idea has previously been used in Canopy (McCallum, A., Nigam, K., and Ungar, L. H. 2000. Efficient Clustering of High-Dimensional Data Sets with Application to Reference Matching. In *Proceedings of KDD*-2000. Boston, Mass.)

3) Compute the similarity between p and the candidates that passed the filter using equation (3) and output the paths in descending order of their similarity to p.

Table 3 lists the Top-50 most similar paths to "X solves Y" generated by an algorithm according to the invention. The ones tagged with an asterisk (*) are incorrect. Most of the paths can be considered as paraphrases of the original expression.

The inference rules discovered by the algorithm represent linguistic knowledge about natural language expressions. In turn, this knowledge can be used to mine other types of knowledge from text. Consider the Top-50 paths similar to "X causes Y" generated by the invention in Table 4. Suppose one wants to find out from the medical literature causal relationships involving the drug phentolamine. Many information extraction (IE) systems make use of manually constructed templates that are semantically similar to the paths in Table 4. Translating the paths into extraction templates, an IE system can be used to extract causal relations from medical text. The incorrect paths (with asterisks) in Table 4 exemplify a main source of error in the invention. The problem is that a cause in a causal event might be the effect of another causal event. Therefore, there is a significant overlap between the SlotX and SlotY of the path "X cause Y". Since the similarity between paths depends totally on the similarity of their slots, slots with the same kind of fillers are not distinguished in the present invention. It is easy to predict whether this type of error will happen in the outputs for a given path by computing the similarity between its SlotX and its SlotY. The higher this similarity is, the more likely the problem arises. However, teasing out the incorrect inference rules caused by this may be difficult, hence some caution has to be taken when using the results.

Better tools are necessary to tap into the vast amount of textual data that is growing at an astronomical pace. Knowledge about inference relationships in natural language expressions would be extremely useful for such tools. In the present invention, such knowledge is discovered automatically from a large corpus of text. Paths in dependency trees tend to have similar meanings if they connect similar sets of words. Treating paths as binary relations, the inventive system is able to generate inference rules by searching for similar paths. It is difficult for humans to recall a list of inference rules. However, given the output of the present invention, humans can easily identify the correct inference rules. Hence, at the least, the present system would greatly ease the manual construction of inference rules for an information retrieval system.

Care must be taken to account for polarity in inference relationships. High similarity values are often assigned to relations with opposite polarity. For example, "X worsens Y" has one of the highest similarity to "X solves Y" according to equation (2). In some situations, this may be helpful while for others it may cause confusion.

Paths may be extended with constraints on the inference rule's variables. For example, instead of generating a rule "X manufactures Y≈X's Y factory", there may be generated a rule with an additional clause: "X manufactures Y≈X's Y factory, where Y is an artifact". The "where" clause can be potentially discovered by generalizing the intersection of the SlotY fillers of the two relations.

Immaterial modifications may be made to the invention described here without departing from the essence of the invention.

TABLE 1

A subset of the dependency relations in Minipar outputs.

| RELATION | DESCRIPTION | EXAMPLE |
| --- | --- | --- |
| appo | appositive of a noun | the CEO, John |
| det | determiner of a noun | the dog |
| gen | genitive modifier of a noun | John's dog |
| mod | adjunct modifier of any type of head | tiny hole |
| nn | prenominal modifier of a noun | station manager |
| pcomp | complement of a preposition | in the garden |
| subj | subject of a verb | John loves Mary. |
| sc | small clause complement of a verb | She forced him to resign |

TABLE 2a

An example entry in the triple database for the path "X pulls body from Y".

X pulls body from Y:

SlotX:

| | | |
| --- | --- | --- |
| diver | 1 | 2.45 |
| equipment | 1 | 1.65 |
| police | 2 | 2.24 |
| rescuer | 3 | 4.84 |
| resident | 1 | 1.60 |
| who | 2 | 1.32 |
| worker | 1 | 1.37 |

SlotY:

| | | |
| --- | --- | --- |
| bus | 2 | 3.09 |
| coach | 1 | 2.05 |
| debris | 1 | 2.36 |
| feet | 1 | 1.75 |
| hut | 1 | 2.73 |

TABLE 2a-continued

An example entry in the triple database for the path "X pulls body from Y".

X pulls body from Y:

| | | |
|---|---|---|
| landslide | 1 | 2.39 |
| metal | 1 | 2.09 |
| wreckage | 3 | 4.81 |

TABLE 2

Sample slot fillers for two paths extracted from a newspaper corpus.

| "X finds a solution to Y" | | "X solves Y" | |
|---|---|---|---|
| SLOTX | SLOTY | SLOTX | SLOTY |
| commission | strike | committee | problem |
| committee | civil war | clout | crisis |
| committee | crisis | government | problem |
| government | crisis | he | mystery |
| government | problem | she | problem |
| he | problem | petition | woe |
| I | situation | researcher | mystery |
| legislator | budget deficit | resistance | crime |
| sheriff | dispute | sheriff | murder |

TABLE 3

The top-50 most similar paths to "X solves Y".

| | |
|---|---|
| Y is solved by X | X clears up Y |
| X resolves Y | *X creates Y |
| X finds a solution to Y | *Y leads to X |
| X tries to solve Y | *Y is eased between X |
| X deals with Y | X gets down to Y |
| Y is resolved by X | *X worsens Y |
| X addresses Y | X ends Y |
| X seeks a solution to Y | *X blames something for Y |
| X do something about Y | X bridges Y |
| X solution to Y | X averts Y |
| Y is resolved in X | *X talks about Y |
| Y is solved through X | X grapples with Y |
| X rectifies Y | *X leads to Y |
| X copes with Y | X avoids Y |
| X overcomes Y | X solves Y problem |
| X eases Y | X combats Y |
| X tackles Y | X handles Y |
| X alleviates Y | X faces Y |
| X corrects Y | X eliminates Y |
| X is a solution to Y | Y is settled by X |
| X makes Y worse | *X thinks about Y |
| X irons out Y | X comes up with a solution to Y |
| *Y is blamed for X | X offers a solution to Y |
| X wrestles with Y | X helps somebody solve Y |
| X comes to grip with Y | *Y is put behind X |

TABLE 4

The top-50 most similar paths to "X causes Y".

| | |
|---|---|
| Y is caused by X | *Y contributes to X |
| X cause something Y | *X results from Y |
| X leads to Y | *X adds to Y |
| X triggers Y | X means Y |
| *X is caused by Y | *X reflects Y |
| *Y causes X | X creates Y |
| Y is blamed on X | *Y prompts X |
| X contributes to Y | X provoke Y |
| X is blamed for Y | Y reflects X |
| X results in Y | X touches off Y |
| X is the cause of Y | X poses Y |

TABLE 4-continued

The top-50 most similar paths to "X causes Y".

| | |
|---|---|
| *Y leads to X | Y is sparked by X |
| Y results from X | *X is attributed to Y |
| Y is result of X | *Y is cause of X |
| X prompts Y | *X stems from Y |
| X sparks Y | *Y is blamed for X |
| *Y triggers X | *X is triggered by Y |
| X prevents Y | Y is linked to X |
| *X is blamed on Y | X sets off Y |
| Y is triggered by X | X is a factor in Y |
| Y is attributed to X | X exacerbates Y |
| X stems from Y | X eases Y |
| *Y results in X | Y is related to X |
| *X is result of Y | X is linked to Y |
| X fuels Y | X is responsible for Y |

We claim:

1. A method of building a database from text, the method comprising the steps of:
    parsing text to identify paths formed by concatenated relationships between words in the text; and
    generating a database of inference rules comprising pairs of semantically equivalent paths by associating, in a computer, paths with each other based on a similarity measure between the paths.

2. The method of claim 1 in which the similarity measure is based on the frequency of occurrence of words in the paths.

3. The method of claim 2 in which the words are at the end points of the paths.

4. The method of claim 1 in which the step of associating paths with each other comprises the step of counting occurrences of words at the end points of specific paths.

5. The method of claim 4 in which the step of associating paths comprises the step of comparing counts of occurrences of words and associating paths based on the counts of occurrences of the words.

6. The method of claim 5 in which paths are associated only when the similarity measure exceeds a threshold.

7. A method of information retrieval, the method comprising the steps of:
    initiating a search for electronic information; and
    expanding the search by reference to associated paths in a database constructed according to the method of claim 1.

8. The method of claim 7 in which the search is initiated from a location remote from the location of the database.

9. The method of claim 7 in which, in the method steps of claim 1, the similarity measure is based on the frequency of occurrence of words in the paths.

10. The method of claim 9, in which, in the method steps of claim 1, the words are at the end points of the paths.

11. The method of claim 7 in which, in the method steps of claim 1, the step of associating paths with each other comprises the step of counting occurrences of words at the end points of specific paths.

12. The method of claim 11 in which the step of associating paths comprises the step of comparing counts of occurrences of words and associating paths based on the counts of occurrences of the words.

13. The method of claim 12 in which paths are associated only when the similarity measure exceeds a threshold.

14. Computer readable media containing instructions for carrying out the method steps of claim 1.

15. Computer readable media of claim 14 in which, in the instructions for carrying out the method steps of claim 1, the similarity measure is based on the frequency of occurrence of words in the paths.

16. Computer readable media of claim 15 in which, in the instructions for carrying out the method steps of claim 1, the words are at the end points of the paths.

17. Computer readable media of claim 14, in which the instructions for carrying out the step of associating paths with each other comprise instructions for carrying out the step of counting occurrences of words at the end points of specific paths.

18. Computer readable media of claim 17 in which the instructions for carrying out the method step of associating paths comprise instructions for carrying out the method step of comparing counts of occurrences of words and associating paths based on the counts of occurrences of the words.

19. Computer readable media of claim 18 in which, in the instructions for carrying out the method steps, paths are associated only when the similarity measure exceeds a threshold.

* * * * *